United States Patent
Tsuji et al.

(10) Patent No.: US 11,760,380 B2
(45) Date of Patent: Sep. 19, 2023

(54) VEHICLE CONTROL SYSTEM

(71) Applicant: HONDA MOTOR CO., LTD., Tokyo (JP)

(72) Inventors: Kanta Tsuji, Wako (JP); Tadashi Naruse, Wako (JP); Daichi Kato, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 554 days.

(21) Appl. No.: 16/832,757

(22) Filed: Mar. 27, 2020

(65) Prior Publication Data
US 2020/0307632 A1    Oct. 1, 2020

(30) Foreign Application Priority Data

Mar. 29, 2019 (JP) ................................ 2019-067562

(51) Int. Cl.
*B60W 60/00* (2020.01)
*B60W 10/20* (2006.01)
(Continued)

(52) U.S. Cl.
CPC ........ *B60W 60/0016* (2020.02); *B60W 10/20* (2013.01); *B60W 30/181* (2013.01); *B60W 50/038* (2013.01); *B60W 60/0059* (2020.02); *B60W 30/06* (2013.01); *B60W 2540/26* (2013.01); *B60W 2552/45* (2020.02);
(Continued)

(58) Field of Classification Search
CPC ........... B60W 60/005; B60W 60/0016; B60W 60/0053; B60W 10/20; B60W 30/06; B60W 30/181; B60W 50/038; B60W 60/0059; B60W 2540/26; B60W 2552/45;
(Continued)

(56) References Cited

U.S. PATENT DOCUMENTS 9,205,816 B2    12/2015 Kobana et al.
2015/0006012 A1    1/2015 Kammel et al.
(Continued)

FOREIGN PATENT DOCUMENTS

JP    2009274594 A    11/2009
JP    2017097518 A    6/2017
(Continued)

OTHER PUBLICATIONS

Kanagawa Prefectural Police Department, "Type and Meaning of Pavement Markings", Retrieved at: https://web.archive.org/web/20160703172554/http://www.police.pref.kanagawa.jp:80/eng/e_mes/engf1008.htm (Year: 2016).*
(Continued)

*Primary Examiner* — Anne Marie Antonucci
*Assistant Examiner* — Jodi Marie Jones
(74) *Attorney, Agent, or Firm* — Armstrong Teasdale LLP

(57) ABSTRACT

In a vehicle control system, a control unit executes a stop process by which the vehicle is parked in a prescribed stop position when it is detected that the control unit or the driver has become incapable of properly maintaining a traveling state of the vehicle, and, in the stop process, if a sidewalk or a road sign is recognized ahead of the vehicle according to a signal from an external environment recognition device, the control unit determines the stop position according to the recognized sidewalk or road sign.

7 Claims, 8 Drawing Sheets

(51) Int. Cl.
  *B60W 30/18* (2012.01)
  *B60W 50/038* (2012.01)
  *B60W 30/06* (2006.01)
  *B62D 15/02* (2006.01)

(52) U.S. Cl.
  CPC ... *B60W 2554/20* (2020.02); *B60W 2554/801* (2020.02); *B62D 15/0285* (2013.01)

(58) Field of Classification Search
  CPC ......... B60W 2552/53; B60W 2554/20; B60W 2554/801; B62D 15/0285
  See application file for complete search history.

(56) References Cited

U.S. PATENT DOCUMENTS

| | | | | |
|---|---|---|---|---|
| 2017/0021863 | A1* | 1/2017 | Thompson | B60R 1/00 |
| 2017/0261994 | A1* | 9/2017 | Simmons | G05D 1/0891 |
| 2018/0111628 | A1* | 4/2018 | Tamagaki | B60W 50/12 |
| 2018/0284772 | A1* | 10/2018 | Ravichandran | G05D 1/0212 |
| 2018/0357484 | A1 | 12/2018 | Omata | |
| 2019/0155283 | A1* | 5/2019 | Herbach | G01C 21/3461 |
| 2019/0315366 | A1* | 10/2019 | Yoo | B60W 50/0098 |
| 2021/0183099 | A1* | 6/2021 | Fujii | G06T 7/74 |
| 2021/0302570 | A1* | 9/2021 | Ichiki | G01S 13/865 |

FOREIGN PATENT DOCUMENTS

| | | |
|---|---|---|
| JP | 2017138694 A | 8/2017 |
| JP | 6355780 B1 | 7/2018 |
| WO | 2013008299 A1 | 1/2013 |
| WO | WO2016002276 A1 | 4/2017 |

OTHER PUBLICATIONS

Notice of Reasons for Refusal for Patent Application JP 2019-067562; 6 pp.
First Review of the Opinion Notice for Chinese Application No. 202010223498, dated Dec. 8, 2022, 8 pps.

* cited by examiner

VEHICLE CONTROL SYSTEM

TECHNICAL FIELD

The present invention relates to a vehicle system configured for autonomous driving.

BACKGROUND ART

According to a known lane change assist system, a lane change assist is provided to the driver by accelerating/decelerating and steering the vehicle according to relative information pertaining to a relative speed between the own vehicle and a surrounding vehicle, and road information describing the road on which the vehicle is traveling. See JP2009-274594A, for instance.

An emergency evacuation system is also known. Upon detecting an abnormal condition of the driver by using various sensors, the emergency evacuation system evacuates the vehicle to a safe position, and stops the vehicle at this position. See WO2013/008299A, for instance.

In a vehicle control system that is configured for autonomous driving, when the driver does not take over the driving operation in response to a handover request, it is desired that the vehicle be evacuated to a safe position and brought to a stop. At this time, the vehicle control system is desired to select the stop position so as not to disrupt the traffic of other vehicles and pedestrians.

SUMMARY OF THE INVENTION

In view of such a problem of the prior art, a primary object of the present invention is to provide a vehicle control system configured for autonomous driving that allows the vehicle to come to a stop at a stop position so as not to disrupt the traffic of other vehicles and pedestrians when the driver fails to properly respond to a handover request.

To achieve such an object, the present invention provides a vehicle control system (1, 101), comprising: a control unit (15) for steering, accelerating, and decelerating a vehicle; an occupant monitoring device (11) configured to monitor a driver of the vehicle; and an external environment recognition device (6) configured to acquire information on an environment surrounding the vehicle; wherein the control unit is configured to execute a stop process by which the vehicle is parked in a prescribed stop position when it is detected that the control unit or the driver has become incapable of properly maintaining a traveling state of the vehicle, and wherein, in the stop process, if a sidewalk or a road marking is recognized ahead of the vehicle according to a signal from the external environment recognition device, the control unit determines the stop position according to the recognized sidewalk or road marking.

The vehicle can be thus parked or brought to a stop at a position so as to provide a space for the passage of other vehicles or pedestrians. As a result, the vehicle can be brought to a stop at an appropriate position that does not obstruct or otherwise disrupt the traffic of other vehicles or pedestrians.

Preferably, when a sidewalk is recognized in front of or on a side of the vehicle according to a signal from the external environment recognition device while the stop process is being executed, the control unit determines the stop position (X) in a part of a roadway bordering a right edge of the roadway.

When the road on which the vehicle is traveling has a sidewalk, the vehicle is brought to a stop so as to border on the right edge of the roadway. As a result, the vehicle is prevented from intruding into the sidewalk, and the traffic of pedestrians is not obstructed. In addition, since the vehicle is brought to a stop on the right edge of the roadway, the disruption of the traffic of other vehicles on the roadway can be minimized.

Preferably, when a sidewalk is not recognized, and a road marking permitting parking in a road shoulder is detected in front of or on a side of the vehicle according to a signal from the external environment recognition device while the stop process is being executed, the control unit determines the stop position (Z) on a part of a road so as to define a space of a prescribed width between a right side of the vehicle and a right edge of the road shoulder.

When there is no sidewalk and there is a road shoulder that can be used for parking, the vehicle is parked at a position spaced from the right edge of the road. As a result, a gap having a width that allows pedestrians to pass is secured between the right edge of the road and the right side of the vehicle so that the disruption to the traffic of pedestrians can be minimized.

Preferably, when a sidewalk is not recognized, and a road marking prohibiting parking in a road shoulder (D2, D3) is detected in front of or on a side of the vehicle according to a signal from the external environment recognition device while the stop process is being executed, the control unit determines the stop position (U) on a part of a road bordering a left edge of the road shoulder.

If there is no sidewalk and there is a road shoulder where stopping is prohibited (a pedestrian-only road shoulder or a parking/stopping prohibited road shoulder), the vehicle is brought to a stop on the left edge of the road shoulder outside of the road shoulder. As a result, the vehicle is prevented from intruding into the road shoulder where the vehicle is prohibited from stopping or parking.

Preferably, when a sidewalk is not recognized, and a shoulder is not recognized according to a signal from the external environment recognition device while the stop process is being executed, the control unit determines the stop position (Y) in a part of a road bordering a right edge of the road (F).

When there is no sidewalk and there is no road shoulder, the vehicle is brought to a stop on the right edge of the road. As a result, even when the vehicle is stopped, the disruption to the traffic of the surrounding vehicles can be minimized.

Preferably, in executing the stop process, the external environment recognition device is configured to detect an object outside of the vehicle, and the control unit is configured to compute a similarity between a detection result of the external environment recognition device and the sidewalk or the road marking, and to determine whether the sidewalk or the road marking has been recognized according to a degree of similarity between the detection result of the external environment recognition device and the sidewalk or the road marking.

Thus, the sidewalk and the road marking can be respectively recognized by computing and evaluating the similarity between the detection result by the external world recognition device and the sidewalk and the road marking which may be stored in the control unit in a suitable form of data in advance.

Preferably, in executing the stop process, when the degree of similarity is equal to or lower than a prescribed threshold, the control unit decelerates the vehicle as a case of a failure to fully recognize the sidewalk or the road marking.

Since the vehicle is decelerated when the sidewalk or the road marking is difficult to recognize, the external world recognition device is enabled to better recognize the sidewalk and the road marking so that the vehicle can be brought to a stop more safely and appropriately by taking into account the presence of the sidewalk and the road marking.

Preferably, in executing the stop process, when the degree of similarity is equal to or lower than a prescribed threshold, the control unit decelerates the vehicle as a case of a failure to fully recognize the sidewalk or the road marking, and moves the vehicle rightward by a prescribed distance.

Since the vehicle is moved rightward when the sidewalk or the road marking is difficult to recognize, the external environment recognition device is enabled to better recognize the sidewalk and the road marking so that the vehicle can be brought to a stop more safely and appropriately by taking into account the presence of the sidewalk and the road marking.

Preferably, in executing the stop process, the control unit brings the vehicle to a stop at the stop position when the stop position is within a prescribed range from a current position of the vehicle, and at a position closer to the vehicle than a boundary of the prescribed range when the stop area is outside of the prescribed range.

Thereby, the vehicle can be stopped more quickly.

The present invention thus provides a vehicle control system configured for autonomous driving that allows the vehicle to come to a stop at a stop position so as not to disrupt the traffic of other vehicles and pedestrians when the driver fails to properly respond to a handover request.

BRIEF DESCRIPTION OF THE DRAWING(S)

DESCRIPTION OF THE PREFERRED EMBODIMENT(S)

A vehicle control system according to a preferred embodiment of the present invention is described in the following with reference to the appended drawings. The following disclosure is according to left-hand traffic. In the case of right-hand traffic, the left and the right in the disclosure will be reversed.

First Embodiment

Figure 1:
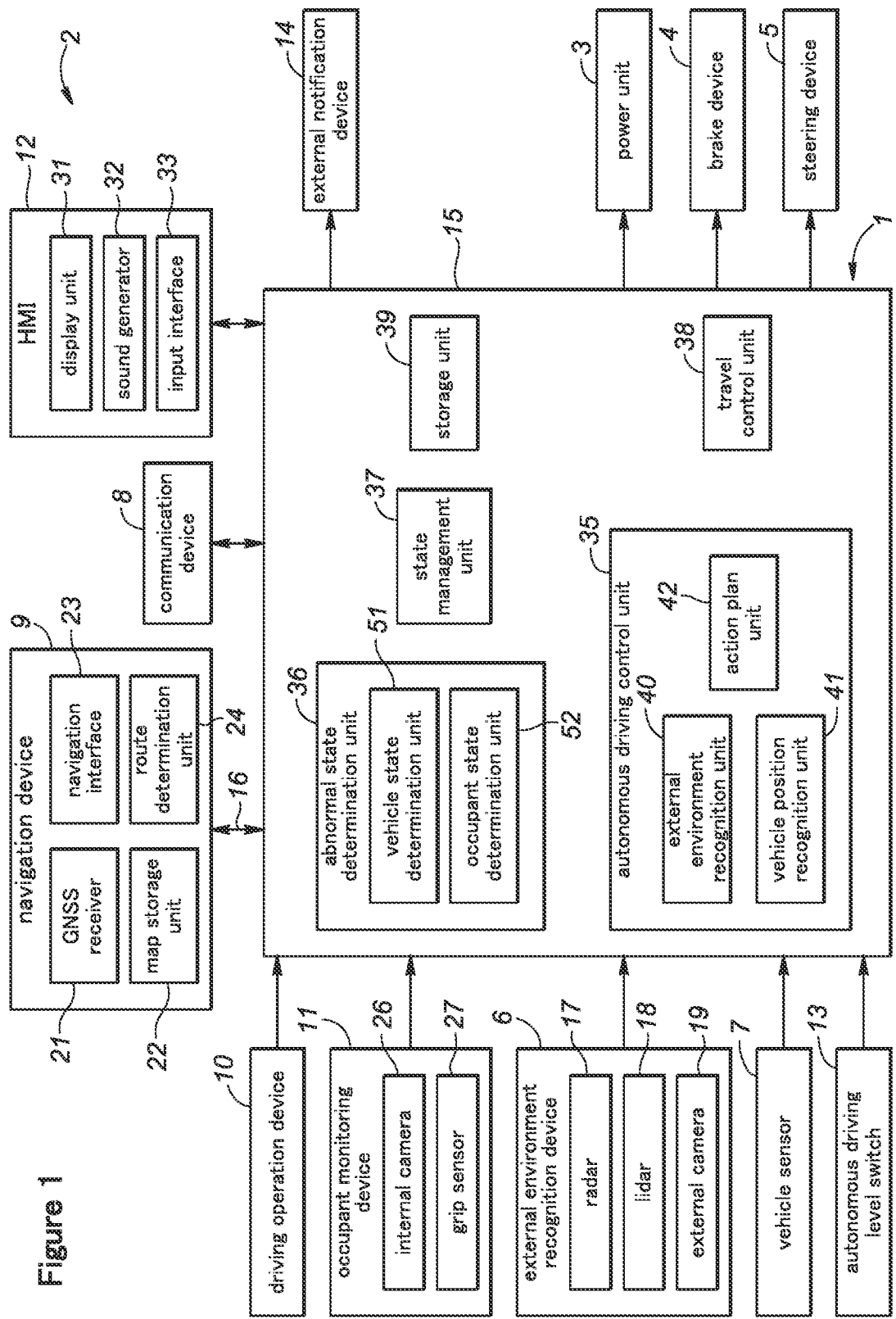
FIG. 1 is a functional block diagram of a vehicle system mounted on a vehicle.

As shown in FIG. 1, the vehicle control system 1 according to the present invention is a part of a vehicle system 2 mounted on a vehicle. The vehicle system 2 includes a power unit 3, a brake device 4, a steering device 5, an external environment recognition device 6, a vehicle sensor 7, a communication device 8, a navigation device 9 (map device), a driving operation device 10, an occupant monitoring device 11, an HMI 12 (Human Machine Interface), an autonomous driving level switch 13, an external notification device 14, and a control unit 15. These components of the vehicle system 2 are connected to one another so that signals can be transmitted between them via a communication means such as CAN 16 (Controller Area Network).

The power unit 3 is a device for applying a driving force to the vehicle, and may include a power source and a transmission unit. The power source may consist of an internal combustion engine such as a gasoline engine and a diesel engine, an electric motor or a combination of these. The brake device 4 is a device that applies a braking force to the vehicle, and may include a brake caliper that presses a brake pad against a brake rotor, and an electrically actuated hydraulic cylinder that supplies hydraulic pressure to the brake caliper. The brake device 4 may also include a parking brake device. The steering device 5 is a device for changing a steering angle of the wheels, and may include a rack-and-pinion mechanism that steers the front wheels, and an electric motor that drives the rack-and-pinion mechanism. The power unit 3, the brake device 4, and the steering device 5 are controlled by the control unit 15.

The external environment recognition device 6 is a device that detects objects located outside of the vehicle. The external environment recognition device 6 may include a sensor that captures electromagnetic waves or light from around the vehicle to detect objects outside of the vehicle, and may consist of a radar 17, a lidar 18, an external camera 19, or a combination of these. The external environment recognition device 6 may also be configured to detect objects outside of the vehicle by receiving a signal from a source outside of the vehicle. The detection result of the external environment recognition device 6 is forwarded to the control unit 15.

The radar 17 emits radio waves such as millimeter waves to the surrounding area of the vehicle, and detects the position (distance and direction) of an object by capturing the reflected wave. Preferably, the radar 17 includes a front radar that radiates radio waves toward the front of the vehicle, a rear radar that radiates radio waves toward the rear of the vehicle, and a pair of side radars that radiates radio waves in the lateral directions.

The lidar 18 emits light such as an infrared ray to the surrounding part of the vehicle, and detects the position (distance and direction) of an object by capturing the reflected light. At least one lidar 18 is provided at a suitable position of the vehicle.

The external camera 19 can capture the image of the surrounding objects such as vehicles, pedestrians, guardrails, curbs, walls, median strips, road shapes, road signs, road markings painted on the road, and the like. The external camera 19 may consist of a digital camera using a solid-state imaging device such as a CCD and a CMOS. At least one external camera 19 is provided at a suitable position of the vehicle. The external camera 19 preferably includes a front camera that images the front of the vehicle, a rear camera that images the rear of the vehicle and a pair of side cameras that image the lateral views from the vehicle. The external camera 19 may consist of a stereo camera that can capture a three-dimensional image of the surrounding objects.

The vehicle sensor 7 may include a vehicle speed sensor that detects the traveling speed of the vehicle, an acceleration sensor that detects the acceleration of the vehicle, a yaw rate sensor that detects an angular velocity of the vehicle around a vertical axis, a direction sensor that detects the traveling direction of the vehicle, and the like. The yaw rate sensor may consist of a gyro sensor.

The communication device 8 allows communication between the control unit 15 which is connected to the navigation device 9 and other vehicles around the own vehicle as well as servers located outside the vehicle. The control unit 15 can perform wireless communication with the surrounding vehicles via the communication device 8. For instance, the control unit 15 can communicate with a server that provides traffic regulation information via the communication device 8, and with an emergency call center that accepts an emergency call from the vehicle also via the communication device 8. Further, the control unit 15 can communicate with a portable terminal carried by a person such as a pedestrian present outside the vehicle via the communication device 8.

The navigation device 9 is able to identify the current position of the vehicle, and performs route guidance to a destination and the like, and may include a GNSS receiver 21, a map storage unit 22, a navigation interface 23, and a route determination unit 24. The GNSS receiver 21 identifies the position (latitude and longitude) of the vehicle according to a signal received from artificial satellites (positioning satellites). The map storage unit 22 may consist of a per se known storage device such as a flash memory and a hard disk, and stores or retains map information. The navigation interface 23 receives an input of a destination or the like from the user, and provides various information to the user by visual display and/or speech. The navigation interface 23 may include a touch panel display, a speaker, and the like. In another embodiment, the GNSS receiver 21 is configured as a part of the communication device 8. The map storage unit 22 may be configured as a part of the control unit 15 or may be configured as a part of an external server that can communicate with the control unit 15 via the communication device 8.

The map information may include a wide range of road information which may include, not exclusively, road types such as expressways, toll roads, national roads, and prefectural roads, the number of lanes of the road, road markings such as the center position of each lane (three-dimensional coordinates including longitude, latitude, and height), road division lines and lane lines, the presence or absence of sidewalks, curbs, fences, etc., the locations of intersections, the locations of merging and branching points of lanes, the areas of emergency parking zones, the width of each lane, and traffic signs provided along the roads. The map information may also include traffic regulation information, address information (address/postal code), facility information, telephone number information, and the like.

The route determination unit 24 determines a route to the destination according to the position of the vehicle specified by the GNSS receiver 21, the destination input from the navigation interface 23, and the map information. When determining the route, in addition to the route, the route determination unit 24 determines the target lane which the vehicle will travel in by referring to the merging and branching points of the lanes in the map information.

The driving operation device 10 receives an input operation performed by the driver to control the vehicle. The driving operation device 10 may include a steering wheel, an accelerator pedal, and a brake pedal. Further, the driving operation device 10 may include a shift lever, a parking brake lever, and the like. Each element of the driving operation device 10 is provided with a sensor for detecting an operation amount of the corresponding operation. The driving operation device 10 outputs a signal indicating the operation amount to the control unit 15.

The occupant monitoring device 11 monitors the state of the occupant in the passenger compartment. The occupant monitoring device 11 includes, for example, an internal camera 26 that images an occupant sitting on a seat in the vehicle cabin, and a grip sensor 27 provided on the steering wheel. The internal camera 26 is a digital camera using a solid-state imaging device such as a CCD and a CMOS. The grip sensor 27 is a sensor that detects if the driver is gripping the steering wheel, and outputs the presence or absence of the grip as a detection signal. The grip sensor 27 may be formed of a capacitance sensor or a piezoelectric device provided on the steering wheel. The occupant monitoring device 11 may include a heart rate sensor provided on the steering wheel or the seat, or a seating sensor provided on the seat. In addition, the occupant monitoring device 11 may be a wearable device that is worn by the occupant, and can detect the vital information of the driver including at least one of the heart rate and the blood pressure of the driver. In this conjunction, the occupant monitoring device 11 may be configured to be able to communicate with the control unit 15 via a per se known wireless communication means. The occupant monitoring device 11 outputs the captured image and the detection signal to the control unit 15.

The external notification device 14 is a device for notifying to people outside of the vehicle by sound and/or light, and may include a warning light and a horn. A headlight (front light), a taillight, a brake lamp, a hazard lamp, and a vehicle interior light may function as a warning light.

The HMI 12 notifies the occupant of various kinds of information by visual display and speech, and receives an input operation by the occupant. The HMI 12 may include at least one of a display device 31 such as a touch panel and an indicator light including an LCD or an organic EL, a sound generator 32 such as a buzzer and a speaker, and an input interface 33 such as a GUI switch on the touch panel and a mechanical switch. The navigation interface 23 may be configured to function as the HMI 12.

The autonomous driving level switch 13 is a switch that activates autonomous driving as an instruction from the driver. The autonomous driving level switch 13 may be a mechanical switch or a GUI switch displayed on the touch panel, and is positioned in a suitable part of the cabin. The autonomous driving level switch 13 may be formed by the input interface 33 of the HMI 12 or may be formed by the navigation interface 23.

The control unit 15 may consist of an electronic control unit (ECU) including a CPU, a ROM, a RAM, and the like. The control unit 15 executes various types of vehicle control by executing arithmetic processes according to a computer program executed by the CPU. The control unit 15 may be configured as a single piece of hardware, or may be configured as a unit including a plurality of pieces of hardware. In addition, at least a part of each functional unit of the control unit 15 may be realized by hardware such as an LSI, an ASIC, and an FPGA, or may be realized by a combination of software and hardware.

The control unit 15 is configured to execute autonomous driving control of at least level 0 to level 3 by combining various types of vehicle control. The level is according to the definition of SAE J3016, and is determined in relation to the degree of machine intervention in the driving operation of the driver and in the monitoring of the surrounding environment of the vehicle.

In autonomous driving of level 0, the control unit 15 does not control the vehicle, and the driver performs all of the driving operations. Thus, autonomous driving of level 0 means a manual driving.

In autonomous driving of level 1, the control unit 15 executes a certain part of the driving operation, and the driver performs the remaining part of the driving operation. For example, autonomous driving level 1 includes constant speed traveling, inter-vehicle distance control (ACC; Adaptive Cruise Control) and lane keeping assist control (LKAS; Lane Keeping Assistance System). The level 1 autonomous driving is executed when various devices (for example, the external environment recognition device 6 and the vehicle sensor 7) required for executing the level 1 autonomous driving are all properly functioning.

In autonomous driving of level 2, the control unit 15 performs the entire driving operation. The level 2 autonomous driving is performed only when the driver monitors the surrounding environment of the vehicle, the vehicle is within a designated area, and the various devices required for performing the level 2 autonomous driving are all functioning properly.

In level 3 autonomous driving, the control unit 15 performs the entire driving operation. The level 3 autonomous driving requires the driver to monitor or be aware of the surrounding environment when required, and is executed only when the vehicle is within a designated area, and the various devices required for performing the level 3 autonomous driving are all functioning properly. The conditions under which the level 3 autonomous driving is executed may include that the vehicle is traveling on a congested road. Whether the vehicle is traveling on a congested road or not may be determined according to traffic regulation information provided from a server outside of the vehicle, or, alternatively, that the vehicle speed detected by the vehicle speed sensor is determined to be lower than a predetermined slowdown determination value (for example, 30 km/h) over a predetermined time period.

Thus, in the autonomous driving of levels 1 to 3, the control unit 15 executes at least one of the steering, the acceleration, the deceleration, and the monitoring of the surrounding environment. When in the autonomous driving mode, the control unit 15 executes the autonomous driving of level 1 to level 3. Hereinafter, the steering, acceleration, and deceleration operations are collectively referred to as driving operation, and the driving and the monitoring of the surrounding environment may be collectively referred to as driving.

In the present embodiment, when the control unit 15 has received an instruction to execute autonomous driving via the autonomous driving level switch 13, the control unit 15 selects the autonomous driving level that is suitable for the environment of the vehicle according to the detection result of the external environment recognition device 6 and the position of the vehicle acquired by the navigation device 9, and changes the autonomous driving level as required. However, the control unit 15 may also change the autonomous driving level according the input to the autonomous driving level switch 13.

As shown in FIG. 1, the control unit 15 includes an autonomous driving control unit 35, an abnormal state determination unit 36, a state management unit 37, a travel control unit 38, and a storage unit 39.

The autonomous driving control unit 35 includes an external environment recognition unit 40, a vehicle position recognition unit 41, and an action plan unit 42. The external environment recognition unit 40 recognizes an obstacle located around the vehicle, the shape of the road, the presence or absence of a sidewalk, and road signs according to the detection result of the external environment recognition device 6. The obstacles include, not exclusively, guardrails, telephone poles, surrounding vehicles, and pedestrians. The external environment recognition unit 40 can acquire the state of the surrounding vehicles, such as the position, speed, and acceleration of each surrounding vehicle from the detection result of the external environment recognition device 6. The position of each surrounding vehicle may be recognized as a representative point such as a center of gravity position or a corner position of the surrounding vehicle, or an area represented by the contour of the surrounding vehicle.

The vehicle position recognition unit 41 recognizes a traveling lane, which is a lane in which the vehicle is traveling, and a relative position and an angle of the vehicle with respect to the traveling lane. The vehicle position recognition unit 41 may recognize the traveling lane according to the map information stored in the map storage unit 22 and the position of the vehicle acquired by the GNSS receiver 21. In addition, the lane markings drawn on the road surface around the vehicle may be extracted from the map information, and the relative position and angle of the vehicle with respect to the traveling lane may be recognized by comparing the extracted lane markings with the lane markings captured by the external camera 19.

The action plan unit 42 sequentially creates an action plan for driving the vehicle along the route. More specifically, the action plan unit 42 first determines a set of events for traveling on the target lane determined by the route determination unit 24 without the vehicle coming into contact with an obstacle. The events may include a constant speed traveling event in which the vehicle travels in the same lane at a constant speed, a preceding vehicle following event in which the vehicle follows a preceding vehicle at a certain speed which is equal to or lower than a speed selected by the driver or a speed which is determined by the prevailing environment, a lane changing event in which the vehicle change lanes, a passing event in which the vehicle passes a preceding vehicle, a merging event in which the vehicle merge into the traffic from another road at a junction of the road, a diverging event in which the vehicle travels into a selected road at a junction of the road, an autonomous driving end event in which autonomous driving is ended, and the driver takes over the driving operation, and a stop event in which the vehicle is brought to a stop when a certain condition is met, the condition including a case where the control unit 15 or the driver has become incapable of continuing the driving operation.

The conditions under which the action plan unit 42 invokes the stop event include the case where an input to the internal camera 26, the grip sensor 27, or the autonomous driving level switch 13 in response to an intervention request (a hand-over request) to the driver is not detected during autonomous driving. The intervention request is a warning to the driver to take over a part of the driving, and to perform at least one of the driving operation and the monitoring of the environment corresponding to the part of the driving that is to be handed over. The condition under which the action plan unit 42 invokes the stop even includes the case where the action plan unit 42 has detected that the driver has become incapable of performing the driving while the vehicle is traveling due to a physiological ailment according to the signal from a pulse sensor, the internal camera or the like.

During the execution of these events, the action plan unit 42 may invoke an avoidance event for avoiding an obstacle or the like according to the surrounding conditions of the vehicle (existence of nearby vehicles and pedestrians, lane narrowing due to road construction, etc.).

The action plan unit 42 generates a target trajectory for the vehicle to travel in the future corresponding to the selected event. The target trajectory is obtained by sequentially arranging trajectory points that the vehicle should trace at each time point. The action plan unit 42 may generate the target trajectory according to the target speed and the target acceleration set for each event. At this time, the information on the target speed and the target acceleration is determined for each interval between the trajectory points.

The travel control unit 38 controls the power unit 3, the brake device 4, and the steering device 5 so that the vehicle traces the target trajectory generated by the action plan unit 42 according to the schedule also generated by the action plan unit 42.

The storage unit 39 is formed by a ROM, a RAM, or the like, and stores information required for the processing by the autonomous driving control unit 35, the abnormal state determination unit 36, the state management unit 37, and the travel control unit 38.

The abnormal state determination unit 36 includes a vehicle state determination unit 51 and an occupant state determination unit 52. The vehicle state determination unit 51 analyzes signals from various devices (for example, the external environment recognition device 6 and the vehicle sensor 7) that affect the level of the autonomous driving that is being executed, and detects the occurrence of an abnormality in any of the devices and units that may prevent a proper execution of the autonomous driving of the level that is being executed.

The occupant state determination unit 52 determines if the driver is in an abnormal state or not according to a signal from the occupant monitoring device 11. The abnormal state includes the case where the driver is unable to properly steer the vehicle in autonomous driving of level 1 or lower that requires the driver to steer the vehicle. That the driver is unable to steer the vehicle in autonomous driving of level 1 or lower could mean that the driver is not holding the steering wheel, the driver is asleep, the driver is incapacitated or unconscious due to illness or injury, or the driver is under a cardiac arrest. The occupant state determination unit 52 determines that the driver is in an abnormal state when there is no input to the grip sensor 27 from the driver while in autonomous driving of level 1 or lower that requires the driver to steer the vehicle. Further, the occupant state determination unit 52 may determine the open/closed state of the driver's eyelids from the face image of the driver that is extracted from the output of the internal camera 26. The occupant state determination unit 52 may determine that the driver is asleep, under a strong drowsiness, unconscious or under a cardiac arrest so that the drive is unable to properly drive the vehicle, and the driver is in an abnormal condition when the driver's eyelids are closed for more than a predetermined time period, or when the number of times the eyelids are closed per unit time interval is equal to or greater than a predetermined threshold value. The occupant state determination unit 52 may further acquire the driver's posture from the captured image to determine that the driver's posture is not suitable for the driving operation or that the posture of the driver does not change for a predetermined time period. It may well mean that the driver is incapacitated due to illness or injury, and in an abnormal condition.

In the case of autonomous driving of level 2 or lower, the abnormal condition includes a situation where the driver is neglecting the duty to monitor the environment surrounding the vehicle. This situation may include either the case where the driver is not holding or gripping the steering wheel or the case where the driver's line of sight is not directed in the forward direction. The occupant state determination unit 52 may detect the abnormal condition where the driver is neglecting to monitor the environment surrounding the vehicle when the output signal of the grip sensor 27 indicates that the driver is not holding the steering wheel. The occupant state determination unit 52 may detect the abnormal condition according to the image captured by the internal camera 26. The occupant state determination unit 52 may use a per se known image analysis technique to extract the face region of the driver from the captured image, and then extracts the iris parts (hereinafter, iris) including the inner and outer corners of the eyes and pupils from the extracted face area. The occupant state determination unit 52 may detect the driver's line of sight according to the positions of the inner and outer corners of the eyes, the iris, the outline of the iris, and the like. It is determined that the driver is neglecting the duty to monitor the environment surrounding the vehicle when the driver's line of sight is not directed in the forward direction.

In addition, in the autonomous driving at a level where the drive is not required to monitor the surrounding environment or in the autonomous driving of level 3, an abnormal condition refers to a state in which the driver cannot promptly take over the driving when a driving takeover request is issued to the driver. The state where the driver cannot take over the driving includes the state where the system cannot be monitored, or, in other words, where the driver cannot monitor a screen display that may be showing an alarm display such as when the driver is asleep, and when the driver is not looking ahead. In the present embodiment, in the level 3 autonomous driving, the abnormal condition includes a case where the driver cannot perform the duty of monitoring the surrounding environment of the vehicle even though the driver is notified to monitor the surrounding environment of the vehicle. In the present embodiment, the occupant state determination unit 52 displays a predetermined screen on the display device 31 of the HMI 12, and instructs the driver to look at the display device 31. Thereafter, the occupant state determination unit 52 detects the driver's line of sight with the internal camera 26, and determines that the driver is unable to fulfill the duty of monitoring the surrounding environment of the vehicle if driver's line of sight is not facing the display device 31 of the HMI 12.

The occupant state determination unit 52 may detect if the driver is gripping the steering wheel according to the signal from the grip sensor 27, and if the driver is not gripping the steering wheel, it can be determined that the vehicle is in an abnormal state in which the duty of monitoring the surrounding environment the vehicle is being neglected. Further, the occupant state determination unit 52 determines if the driver is in an abnormal state according to the image captured by the internal camera 26. For example, the occupant state determination unit 52 extracts a driver's face region from the captured image by using a per se known image analysis means. The occupant state determination unit 52 may further extract iris parts (hereinafter, iris) of the driver including the inner and outer corners of the eyes and pupils from the extracted face area. The occupant state determination unit 52 obtains the driver's line of sight according to the extracted positions of the inner and outer corners of the eyes, the iris, the outline of the iris, and the like. It is determined that the driver is neglecting the duty to monitor the environment surrounding the vehicle when the driver's line of sight is not directed in the forward direction.

The state management unit 37 selects the level of the autonomous driving according to at least one of the own vehicle position, the operation of the autonomous driving level switch 13, and the determination result of the abnormal state determination unit 36. Further, the state management unit 37 controls the action plan unit 42 according to the selected autonomous driving level, thereby performing the autonomous driving according to the selected autonomous driving level. For example, when the state management unit 37 has selected the level 1 autonomous driving, and a constant speed traveling control is being executed, the event to be determined by the action plan unit 42 is limited only to the constant speed traveling event.

The state management unit 37 raises and lowers the autonomous driving level as required in addition to executing the autonomous driving according to the selected level.

More specifically, the state management unit 37 raises the level when the condition for executing the autonomous driving at the selected level is met, and an instruction to raise the level of the autonomous driving is input to the autonomous driving level switch 13.

When the condition for executing the autonomous driving of the current level ceases to be satisfied, or when an instruction to lower the level of the autonomous driving is input to the autonomous driving level switch 13, the state management unit 37 executes an intervention request process. In the intervention request process, the state management unit 37 first notifies the driver of a handover request. The notification to the driver may be made by displaying a message or image on the display device 31 or generating a speech or a warning sound from the sound generator 32. The notification to the driver may continue for a predetermined period of time after the intervention request process is started or may be continued until an input is detected by the occupant monitoring device 11.

The condition for executing the autonomous driving of the current level ceases to be satisfied when the vehicle has moved to an area where only the autonomous driving of a level lower than the current level is permitted, or when the abnormal state determination unit 36 has determined that an abnormal condition that prevents the continuation of the autonomous driving of the current level has occurred to the driver or the vehicle.

Following the notification to the driver, the state management unit 37 detects if the internal camera 26 or the grip sensor 27 has received an input from the driver indicating a takeover of the driving. The detection of the presence or absence of an input to take over the driving is determined in a way that depends on the level that is to be selected. When moving to level 2, the state management unit 37 extracts the driver's line of sight from the image acquired by the internal camera 26, and when the driver's line of sight is facing the front of the vehicle, it is determined that an input indicating the takeover of the driving by the driver is received. When moving to level 1 or level 0, the state management unit 37 determines that there is an input indicating an intent to take over the driving when the grip sensor 27 has detected the gripping of the steering wheel by the driver. Thus, the internal camera 26 and the grip sensor 27 function as an intervention detection device that detects an intervention of the driver to the driving. Further, the state management unit 37 may detect if there is an input indicating an intervention of the driver to the driving according to the input to the autonomous driving level switch 13.

The state management unit 37 lowers the autonomous driving level when an input indicating an intervention to the driving is detected within a predetermined period of time from the start of the intervention request process. At this time, the level of the autonomous driving after the lowering of the level may be level 0, or may be the highest level that can be executed.

The state management unit 37 causes the action plan unit 42 to generate a stop event when an input corresponding to the driver's intervention to the driving is not detected within a predetermined period of time after the execution of the intervention request process. The stop event is an event in which the vehicle is brought to a stop at a safe position (for example, an emergency parking zone, a roadside zone, a roadside shoulder, a parking area, etc.) while the vehicle control is degenerated. Here, a series of procedures executed in the stop event may be referred to as MRM (Minimum Risk Maneuver).

Figure 2:
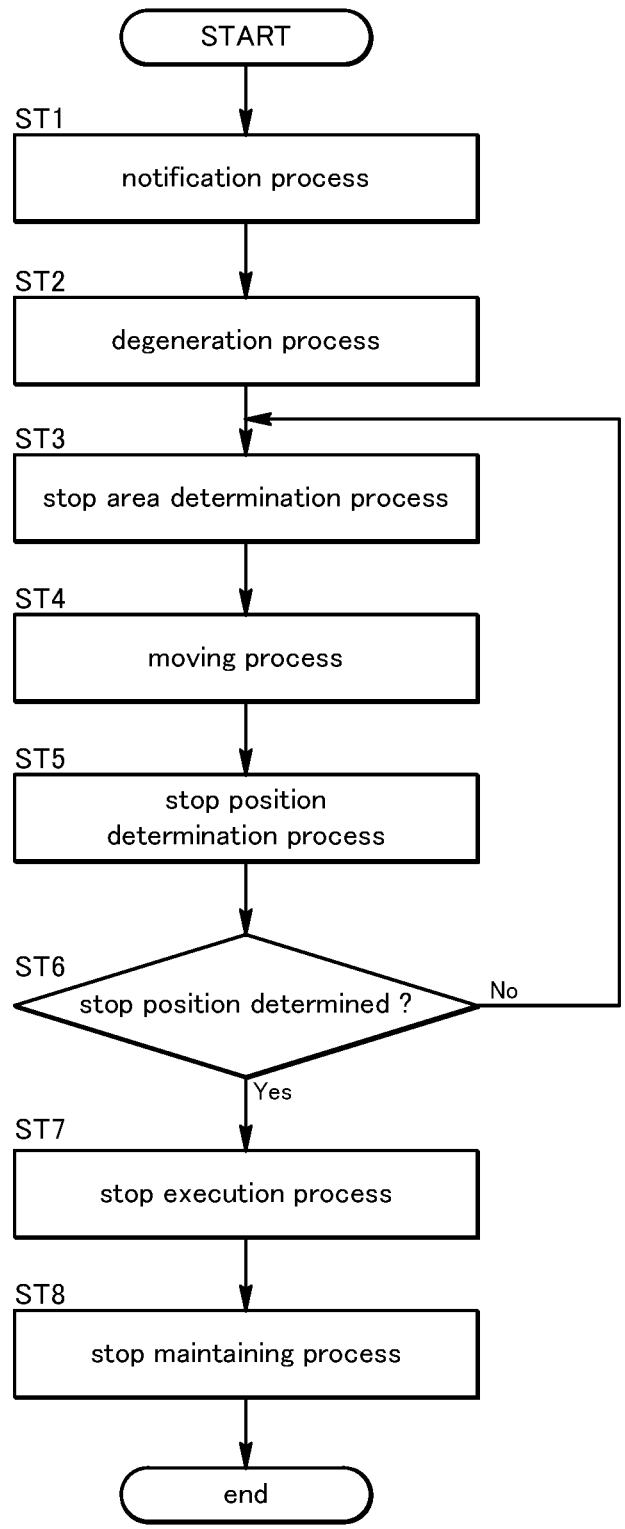
FIG. 2 is a flowchart of a stop process.

When the stop event is invoked, the control unit 15 shifts from the autonomous driving mode to the automatic stop mode, and the action plan unit 42 executes the stop process. Hereinafter, an outline of the stop process is described with reference to the flowchart of FIG. 2.

In the stop process, a notification process is first executed (ST1). In the notification process, the action plan unit 42 operates the external notification device 14 to notify the people outside of the vehicle. For example, the action plan unit 42 activates a horn included in the external notification device 14 to periodically generate a warning sound. The notification process continues until the stop process ends. After the notification process has ended, the action plan unit 42 may continue to activate the horn to generate a warning sound depending on the situation.

Then, a degeneration process is executed (ST2). The degeneration process is a process of restricting events that can be invoked by the action plan unit 42. The degeneration process may prohibit a lane change event to a passing lane, a passing event, a merging event, and the like. Further, in the degeneration process, the speed upper limit and the acceleration upper limit of the vehicle may be more limited in the respective events as compared with the case where the stop process is not performed.

Next, a stop area determination process is executed (ST3). The stop area determination process refers to the map information according to the current position of the own vehicle, and extracts a plurality of available stop areas (candidates for the stop area or potential stop areas) suitable for stopping, such as road shoulders and evacuation spaces in the traveling direction of the own vehicle. Then, one of the available stop areas is selected as the stop area by taking into account the size of the stop area, the distance to the stop area, and the like.

Next, a moving process is executed (ST4). In the moving process, a route for reaching the stop area is determined, various events along the route leading to the stop area are generated, and a target trajectory is determined. The travel control unit 38 controls the power unit 3, the brake device 4, and the steering device 5 according to the target trajectory determined by the action plan unit 42. The vehicle then travels along the route and reaches the stop area.

Next, a stop position determination process is executed (ST5). In the stop position determination process, the stop position is determined according to obstacles, road markings, and other objects located around the vehicle recognized by the external environment recognition unit 40. In the stop position determination process, it is possible that the stop position cannot be determined in the stop area due to the presence of surrounding vehicles and obstacles. When the stop position cannot be determined in the stop position determination process (No in ST6), the stop area determination process (ST3), the movement process (ST4), and the stop position determination process (ST5) are sequentially repeated.

If the stop position can be determined in the stop position determination process (Yes in ST6), a stop execution process is executed (ST7). In the stop execution process, the action plan unit 42 generates a target trajectory according to the current position of the vehicle and the targeted stop position. The travel control unit 38 controls the power unit 3, the brake device 4, and the steering device 5 according to the target trajectory determined by the action plan unit 42. The vehicle then moves toward the stop position and stops at the stop position.

After the stop execution process is executed, a stop maintaining process is executed (ST8). In the stop maintaining process, the travel control unit 38 drives the parking brake device according to a command from the action plan unit 42 to maintain the vehicle at the stop position. Thereafter, the action plan unit 42 may transmit an emergency call to the emergency call center by the communication device 8. When the stop maintaining process is completed, the stop process ends.

Figure 3:
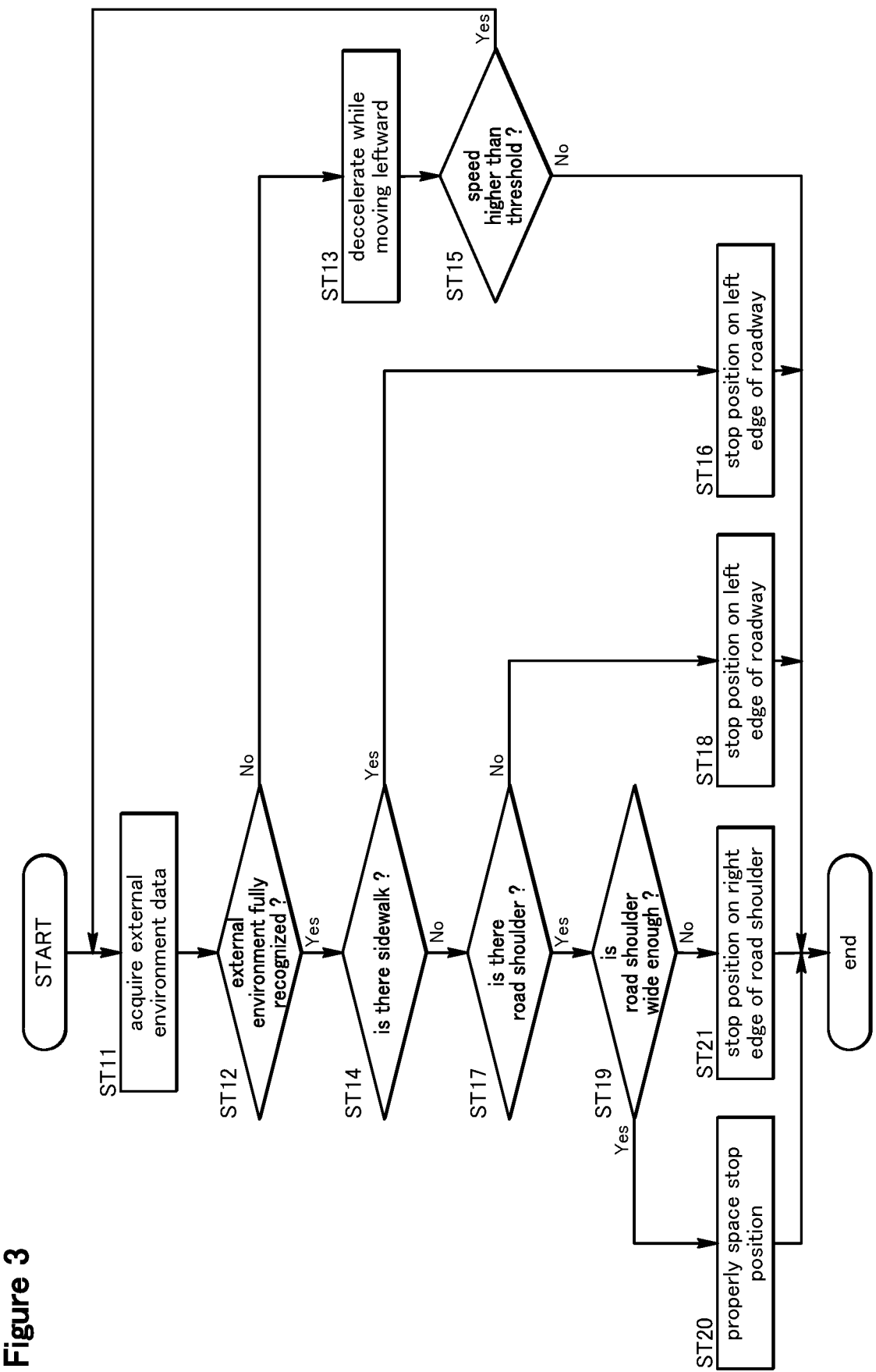
FIG. 3 is a flowchart of a stop position determination process.

In the present embodiment, the vehicle control system 1 includes the external environment recognition device 6, the occupant monitoring device 11, and the control unit 15 as mentioned earlier, and the stop position is determined according to the road conditions, and the control unit 15 causes the vehicle to travel to the stop position, and brings the vehicle to a stop at the stop position. The details of the stop position determination process for determining the stop position are discussed in the following with reference to FIG. 3.

In the first step ST11 of the stop position determination process, the action plan unit 42 obtains information on the road shape, road markings, surrounding vehicles, sidewalks, and obstacles such as parked vehicles and pedestrians from the external environment recognition unit 40.

Figure 4A:
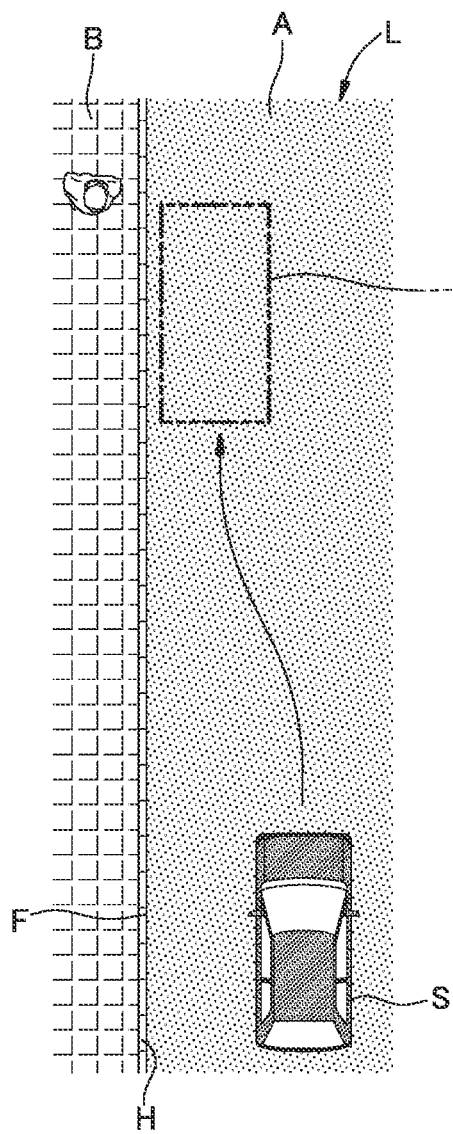
FIG. 4A is a diagram illustrating the movement of a vehicle when coming to stop on a road having a sidewalk when the stop process is being executed in a left-hand traffic region.
Figure 7A:
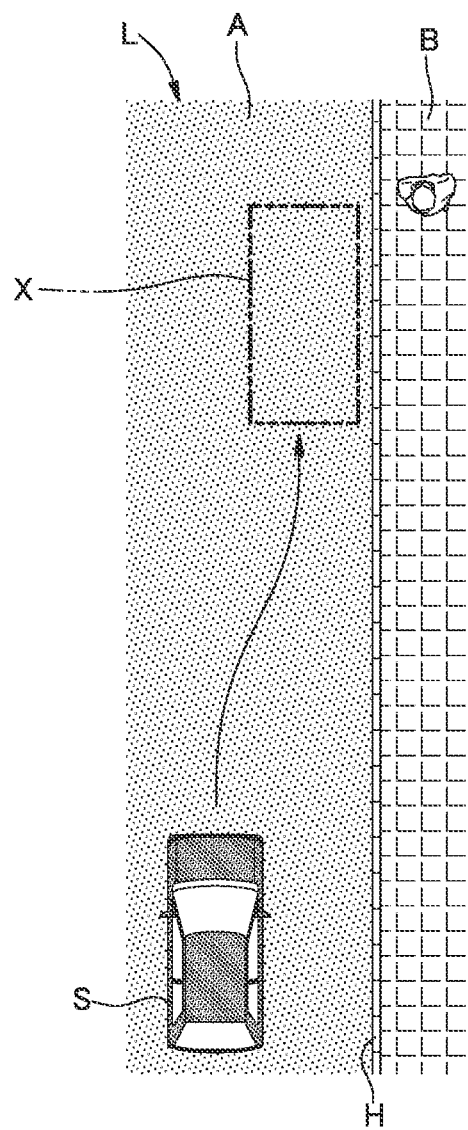
FIG. 7A is a view similar to FIG. 4A in the case of right-hand traffic, instead of left-hand traffic.

The road L includes a roadway A and a sidewalk B as shown in FIGS. 4A and 7A. The roadway A is defined or delimited by a curb H, and corresponds to a part of the road on which vehicle travels. The sidewalk B is defined or delimited by a curb H, and corresponds to a part of the road on which pedestrians walk.

Figure 4B:
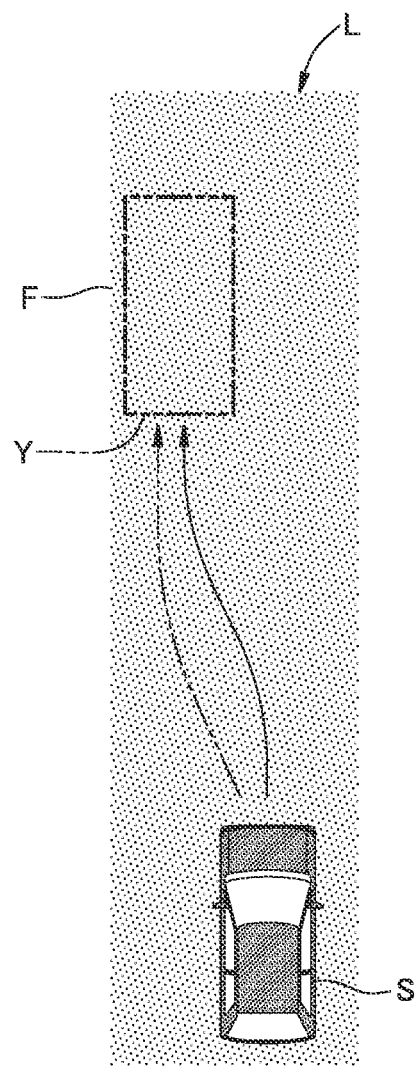
FIG. 4B is a diagram illustrating the movement of a vehicle when coming to stop on a road having no a sidewalk or a road shoulder when the stop process is being executed in a left-hand traffic region.
Figure 5C:
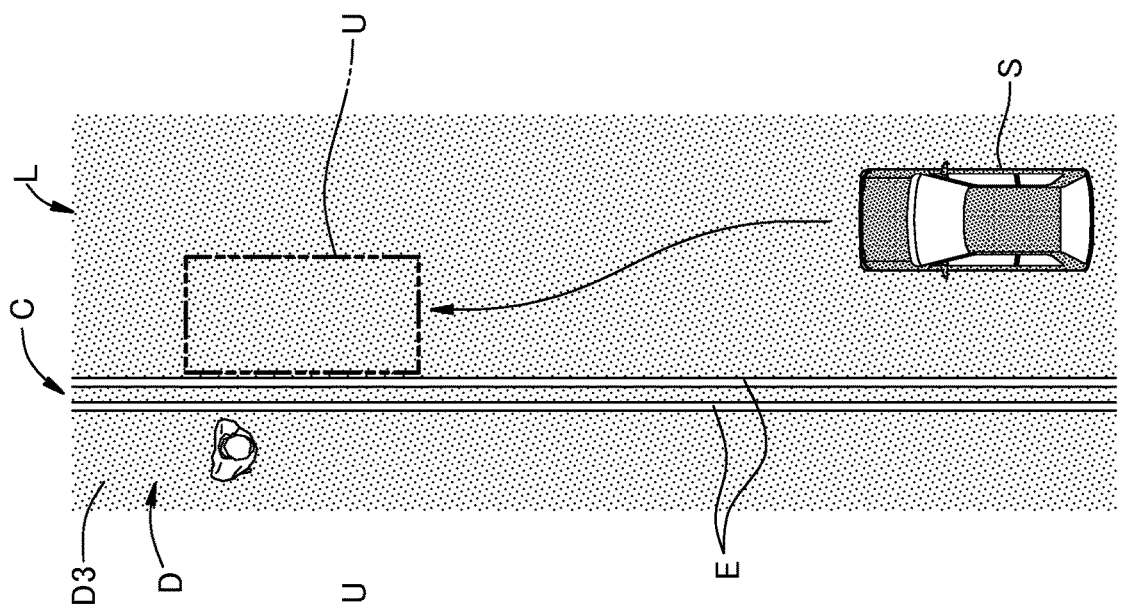
FIG. 5C is a diagram illustrating the movement of a vehicle when coming to stop on a road having a road shoulder which is reserved strictly for pedestrians when the stop process is being executed in a left-hand traffic region.
Figure 5B:
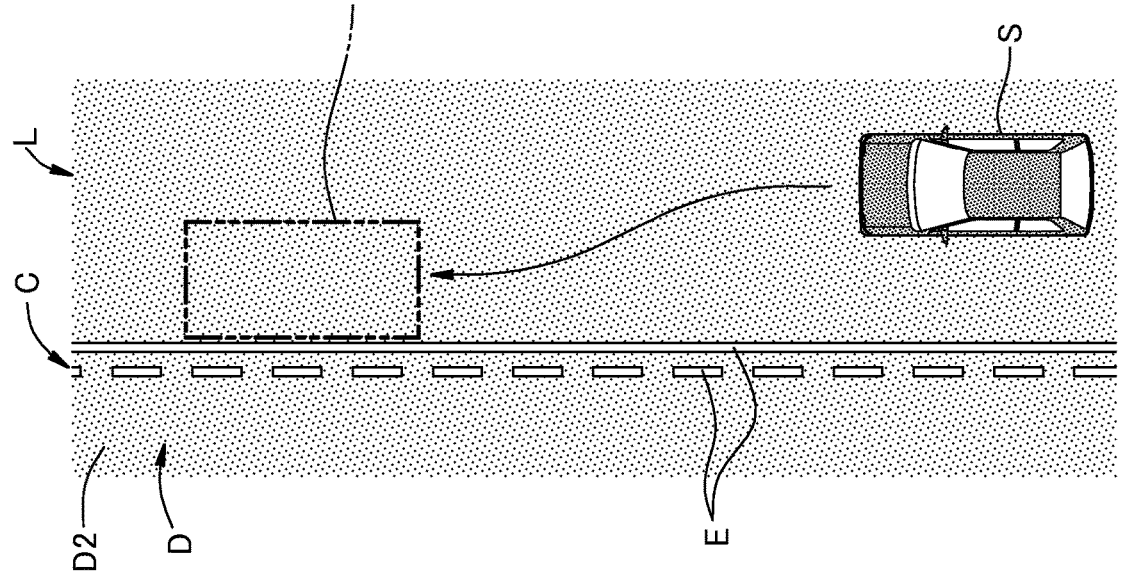
FIG. 5B is a diagram illustrating the movement of a vehicle when coming to stop on a road having a road shoulder in which parking is prohibited when the stop process is being executed in a left-hand traffic region.
Figure 5A:
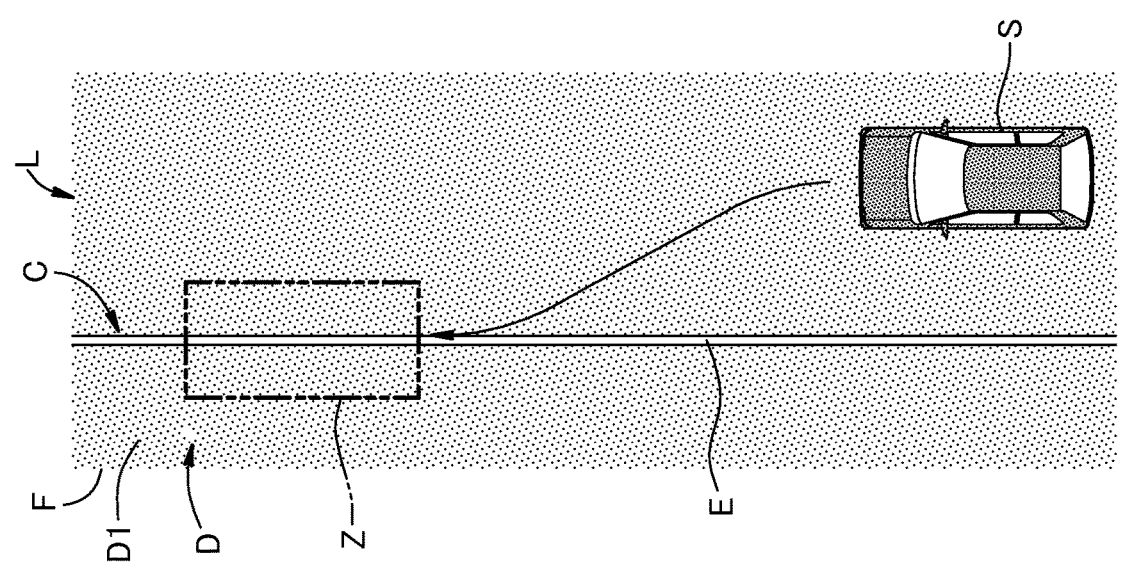
FIG. 5A is a diagram illustrating the movement of a vehicle when coming to stop on a road having a road shoulder in which parking is permitted when the stop process is being executed in a left-hand traffic region.

The road marking C includes painted lines drawn on the road surface, and represent rules for the road (e.g., FIGS. 5A-5C). More specifically, the road marking C may consist of a white line or white lines (marking line E) for defining a road shoulder D which may be allocated for pedestrians to walk or may be used as an extension of the roadway A (for emergency parking and other purposes). In this case, the shoulder D is delimited by the left edge F of the road L and the road marking C (marking line E). The left edge F of the road L is defined as the left edge of the roadway A when there is a sidewalk (e.g., FIG. 4A), the left edge of the road as a whole when there is no sidewalk or a shoulder (e.g., FIG. 4B), the left edge of the road shoulder D when there is a road shoulder (e.g., FIG. 5A).

The action plan unit 42 then executes step ST12. In step ST12, the action plan unit 42 determines if the shape of the road, the road marking C, the surrounding vehicles, the sidewalk B, and external objects such as parked vehicles and pedestrians can be recognized by the external environment recognition unit 40 clearly enough for the control unit 15 to control the vehicle until the vehicle comes to a stop at the stop position.

More specifically, the external environment recognition unit 40 first obtains a detection result of the external environment recognition device 6 which may consist of an image of a view in front of the vehicle captured by the external camera 19. The degree of similarity is then computed by comparing the captured image with an image including, for example, a road sign, a vehicle, a sidewalk, and the like stored in the storage unit 39 in advance. The method of computing the similarity may be based on a per se known pattern matching technique. More specifically, the similarity is computed by superimposing a model image including a road sign, a vehicle, a sidewalk, or the like, which is stored in the storage unit 39 in advance on the captured image, and the degree of overlap is quantified. The external environment recognition unit 40 may further include a classifier that machine-learns images including road signs, vehicles, sidewalks, and the likes in advance by a known method, and may compute the similarity by using the classifier. Further, the action plan unit 42 may extract a part of the image acquired by the external camera 19 corresponding to a road sign on the road, and compares the extracted part corresponding to the road sign with the map information to determine the similarity.

When the similarity is equal to or greater than a predetermined threshold, the action plan unit 42 determines that the external object is sufficiently recognized as required for controlling the vehicle to a stop. When the action plan unit 42 determines in step ST12 that the similarity is less than the predetermined threshold value and the external object is not sufficiently recognized, the action plan unit 42 executes step ST13. If it is determined that the similarity is equal to or greater than the threshold value and that the recognition is sufficient, step ST14 is executed.

In step ST13, the action plan unit 42 commands the travel control unit 38 to control the vehicle so as to move leftward or move the vehicle to a left side of the traveling lane, and decelerate the vehicle by a predetermined value. More specifically, the action plan unit 42 sets a trajectory (for example, see the double-dot chain line arrow in FIG. 4B) that gradually approaches the left edge of the traveling lane inside the traveling lane. The action plan unit 42 then determines the positions on the trajectory so that the vehicle speed decreases by a predetermined value in a predetermined time period. The travel control unit 38 controls the vehicle to trace the trajectory according to a time schedule.

Thereby, the vehicle is decelerated by a predetermined value in a predetermined period of time. After executing step ST13, the action plan unit 42 executes step ST15.

In step ST15, the action plan unit 42 acquires the vehicle speed from the vehicle sensor 7, and determines if the vehicle speed is equal to or higher than a predetermined threshold. When the vehicle speed is equal to or higher than the threshold, the process returns to step ST11. When the vehicle speed is lower than the threshold, the stop position determination process is ended without determining the stop position.

In step ST14, the action plan unit 42 determines if there is a sidewalk B on the left side of the traveling lane according to the information recognized by the external environment recognition unit 40, similarly as in step ST12. More specifically, the external environment recognition unit 40 acquires a detection result of the external environment recognition device 6, or more specifically, an image of the view in front of the vehicle captured by the external camera 19. Thereafter, as in step ST12, the external environment recognition unit 40 superimposes the captured images on the model images or reference images including the curbs, the fences, and the likes stored in the storage unit 39 in advance, and digitizes the degree of matching. Thereby, it can be determined if a curb or a fence is present at the left front of the vehicle. In addition, the external environment recognition unit 40 may include a classifier that machine-learns images including curbs, fences, and the likes in advance, and may determine if a curb or a fence is present at the front left of the vehicle. When a curb or fence is present at the left front of the vehicle, the external environment recognition unit 40 determines that the sidewalk B is present at the left front of the vehicle. If there is a sidewalk B, step ST16 is executed, and if there is no sidewalk B, step ST17 is executed.

In step ST16, as shown in FIG. 4A, the action plan unit 42 sets the stop position inside the roadway A and along the left edge of the roadway A (or the right edge of the sidewalk) or in other words, so as to border along the left edge of the roadway A with a small or substantially no space between the left edge of the roadway A and the left side of the vehicle S). Further, the action plan unit 42 acquires the vehicle speed from the vehicle sensor 7, and computes a travel distance (or a stopping distance) of the vehicle S which the vehicle S will have traveled when the vehicle S is appropriately decelerated from the current vehicle speed until the vehicle S comes to a stop. Thereafter, the action plan unit 42 searches the left edge of the roadway A inside the roadway A to extract a position suitable for the vehicle to come to a stop and located beyond the stopping distance, and determines this position (X: position on the left edge of the roadway) as the stop position. Upon completion of the determination of the stop position, the action plan unit 42 ends the stop position determination process.

In step ST17, the action plan unit 42 determines if a road shoulder D is present on the left side of the traveling lane according to the road marking C recognized by the external environment recognition unit 40. If there is no road shoulder D, step ST18 is executed, and if there is a road shoulder D, step ST19 is executed.

In step ST18, as shown in FIG. 4B, the action plan unit 42 sets the stop position on the left edge of the roadway inside the roadway, or so to border along the left edge F of the roadway A. Further, the action plan unit 42 searches the left edge of the roadway A inside the roadway A to extract a position suitable for the vehicle to come to a stop and located beyond the stopping distance, and determines this position (Y: position on the left edge of the roadway) as the stop position. Upon completion of the determination of the stop position, the action plan unit 42 ends the stop position determination process.

In step ST19, the action plan unit 42 determines if the road shoulder D consists of a road shoulder D1 in which the vehicle is allowed to park or stop. The road shoulder D1 in which the vehicle is allowed to park or stop refers to a road shoulder that is used for vehicles to park or stop and for pedestrians to walk. If the road shoulder D1 is intended for parking or stopping can be determined from the lane marking E that divides the road shoulder D1 from the roadway A.

For example, when the line marking E that divides the road shoulder D1 from the roadway is a single solid white line as shown in FIG. 5A, the action plan unit 42 can determine that the road shoulder D1 is allowed to be used for parking or stopping the vehicle. When the road shoulder D2 is divided from the roadway by a white solid line E and a white broken line E as shown in FIG. 5B, the action plan unit 42 can determine that the road shoulder D2 is not allowed to be used for parking or stopping the vehicle. When the road shoulder D3 is divided from the roadway by two white solid lines E as shown in FIG. 5C, the action plan unit 42 can determine that the road shoulder D3 is reserved for pedestrians, and is therefore prohibited from being used for parking or stopping the vehicle. Step ST20 is executed if the road shoulder D is allowed to be used for parking or stopping the vehicle, and otherwise step ST21 is executed.

In step ST20, as shown in FIG. 5A, the action plan unit 42 places the stop position so that the left side of the vehicle is spaced from the left edge of the road F by prescribed distance (a separation distance). As a result, in this case, the vehicle S is brought to a stop so as to astride over the road marking C consisting of a single solid white line. The separation distance is selected so as to permit pedestrians walking through. In the present embodiment, the separation distance is set to 75 cm. Further, the action plan unit 42 acquires the vehicle speed by the vehicle sensor 7 and computes the stopping distance. The action plan unit 42 then searches the region that is separated from the left edge of the road F by the separation distance in a left and forward direction of the vehicle S, and determines a position (a spaced stop position Z) suitable for the vehicle to come to a stop and located beyond the stopping distance. Upon completion of the determination of the stop position, the action plan unit 42 ends the stop position determination process.

In step ST21, as shown in FIGS. 5B and 5C, the action plan unit 42 places the stop position in the roadway on the right side of the road shoulder (or on the left edge of the roadway) or so as to border along the road marking C from the side of the roadway. Further, the action plan unit 42 acquires the vehicle speed by the vehicle sensor 7 and computes the stopping distance. The action plan unit 42 then searches a region on the right side of the road shoulder (or on the left edge of the roadway) and along the right edge of the road shoulder D, and extracts a position that is located more than a stop distance ahead of the current position of the vehicle. The action plan unit 42 thus determines the position (a right edge of road shoulder stop position U) suitable for the vehicle to come to a stop and located beyond the stopping distance. Upon completion of the determination of the stop position, the action plan unit 42 ends the stop position determination process.

The mode of operation and the advantages of the vehicle control system 1 configured as described above are discussed in the following. In the stop process, the vehicle control system 1 is required to stop the vehicle at an appropriate position that does not hinder the traffic of the surrounding vehicles and pedestrians. More specifically, it is desirable that the vehicle control system 1 stops the vehicle S along the left edge of the road as far left as possible (within a range permitted by applicable regulations) so as not to obstruct other traffic.

FIG. 4A shows the trajectory of the vehicle S traveling on the road L having a sidewalk B on the left side thereof while the stop process is being executed. The trajectory of the vehicle S is indicated by a solid arrow. In this case, the action plan unit 42 determines that there is the sidewalk B in step ST14, and executes step ST16. Therefore, the vehicle S is brought to a stop so as to border along the left edge of the roadway A. Thus, the vehicle S can be brought to a stop at a position that is unlikely to hinder traffic of pedestrians or surrounding vehicles.

FIG. 4B shows the trajectory of the vehicle S traveling on the road L having no sidewalk while the stop process is being executed. The trajectory of the vehicle S is indicated by a solid arrow. In this case, after determining that there is no sidewalk B in step ST14, the action plan unit 42 determines that there is no road shoulder D for the vehicle S to enter to stop therein in step ST17, and executes step ST18. Therefore, the vehicle S is brought to a stop along the left edge of the roadway A. As a result, the vehicle S can be brought to a stop at a position where it is unlikely to interfere with the traffic of surrounding vehicles.

FIG. 5A illustrates a case where the vehicle S is traveling on a road L having a road shoulder D1 that can used for stopping or parking a vehicle. The road shoulder D1 is used also for the traffic of pedestrians. The trajectory of the vehicle is indicated by a solid arrow. In this case, the action plan unit 42 sequentially executes steps ST14, ST17, and ST19, and then executes step ST20. Therefore, the vehicle S is brought to a stop at a position separated from the left edge F of the road on the left side of the road L by a certain distance (75 cm). Thus, the vehicle S moves to the left side of the road L before coming to a stop so that the disruption of the traffic of the surrounding vehicles can be minimized. Further, the left side of the vehicle S is separated from the left edge of the road L by the separation distance for the traffic of pedestrians. Thus, the vehicle S can be brought to a stop at a position where it is unlikely to hinder pedestrian traffic.

In FIG. 5B, the vehicle S travels along a road L having a road shoulder D defined by a white solid line and a white broken line E, meaning that parking is prohibited in the road shoulder D2. The trajectory of the vehicle when the stop process is being executed is indicated by a solid arrow. In this case, the action plan unit 42 sequentially executes steps ST14, ST17, and ST19, and thereafter executes step ST21. As a result, the vehicle S comes to a stop so as to border the left edge of the roadway A inside the roadway or the right edge of the road shoulder D2 outside the road shoulder D2. Thus, the vehicle S can be brought to a stop at a position where it is unlikely to hinder the traffic of the surrounding vehicles without intruding into the road shoulder D2 where parking is prohibited.

In FIG. 5C, the vehicle S is traveling a road L having a road shoulder D3 separated from the roadway A by a pair of solid white lines E, meaning that the road shoulder D3 is for the use of pedestrians only, while the stop process is being executed. In this case, the action plan unit 42 sequentially executes steps ST14, ST17, and ST19, and thereafter executes step ST21. Thus, the vehicle S is brought to a stop outside of the pedestrian-only road shoulder D3 and so as to border along the left edge of the roadway A or along the right edge of the pedestrian-only road shoulder D3. Therefore, the vehicle S can be brought to a stop at a position that is unlikely to hinder traffic of pedestrians and surrounding vehicles.

The external environment recognition device 6 may use a device such as a radar 17 or a lidar 18 that acquires an image by emitting infrared rays or millimeter waves, and capturing the reflection of the infrared rays or millimeter waves. The acquired image may contain noises due to various causes such as the movement and vibrations of the own vehicle. Therefore, as the vehicle speed increases, the error and noise of the image acquired by the external environment recognition device 6 may increase. Accordingly, the recognition accuracy of the presence/absence of the sidewalk B, the shape of the left edge F of the road, the road marking C, and the like by the external environment recognition unit 40 may decline as the vehicle speed increases.

FIG. 4B shows the trajectory of the vehicle S in a double-dot chain line arrow when the external environment recognition unit 40 cannot sufficiently recognize the left edge F of the road, the road shoulder D or the sidewalk B to the extent necessary to safely bring the vehicle S to a stop. At this time, in step ST13, the vehicle S is controlled to decelerate and gradually move leftward in the traveling lane so that there may be greater chance for the external environment recognition unit 40 to recognize the left edge F of the road, the road shoulder D or the sidewalk B. Therefore, the road edge F, the road shoulder D or the sidewalk B can be recognized more reliably than when the vehicle S is decelerated without executing step ST13 of moving the vehicle S to the left in the traveling lane from an early stage. Thereby, the vehicle S can be stopped more safely and more appropriately owing to the execution of step ST13.

Second Embodiment

Figure 6:
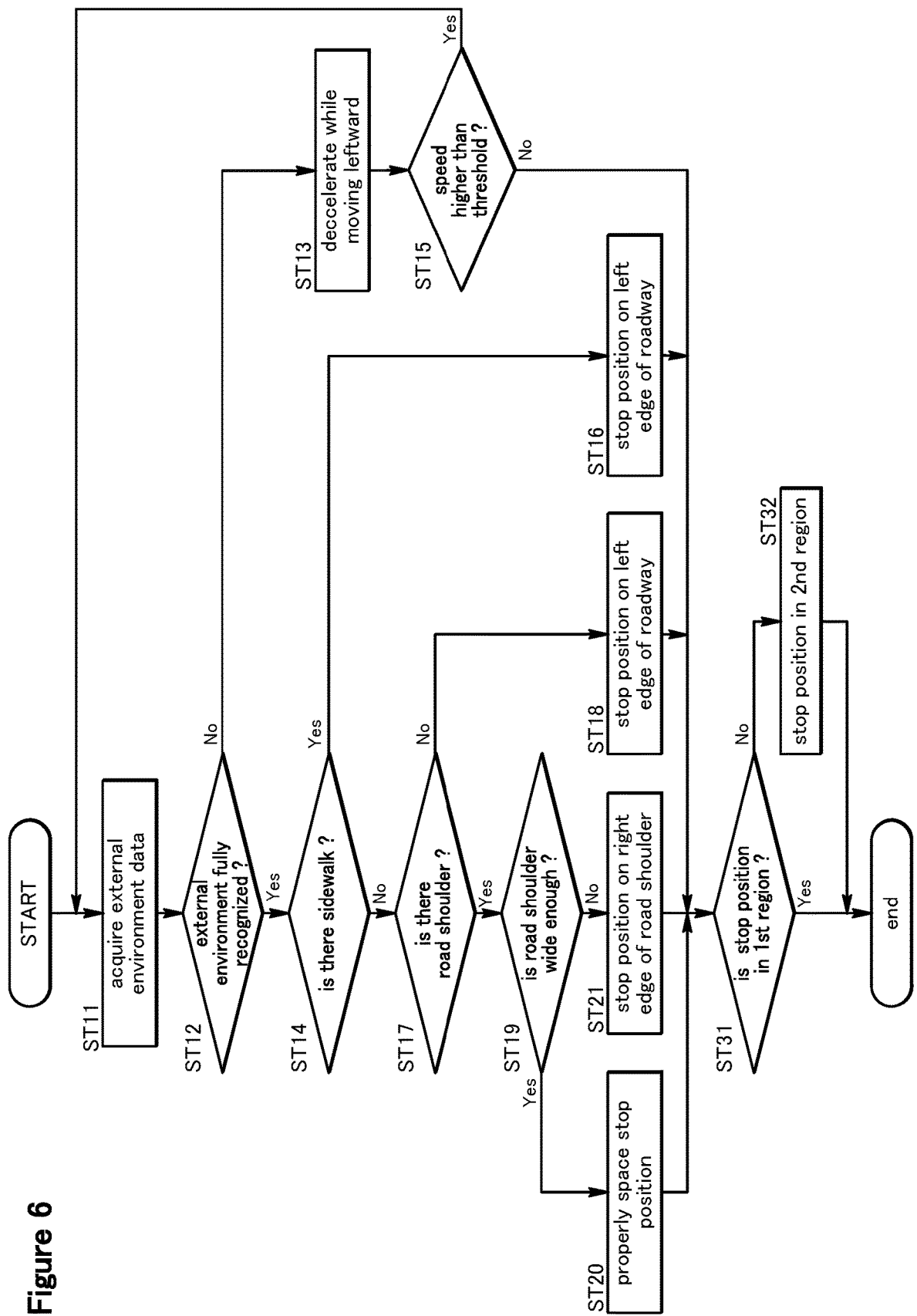
FIG. 6 is a flowchart of a stop position determination process according to a second embodiment of the present invention.

The vehicle control system 101 according to the second embodiment of the present invention differs from that of the first embodiment only in that the stop position determination process further includes steps ST31 and ST32 as shown in FIG. 6. Since the second embodiment is otherwise no different from the first embodiment, the description of common parts will be omitted in the following description.

As shown in FIG. 6, after completing steps ST16, ST18, ST20 and ST21, the action plan unit 42 of the vehicle control system 101 executes step ST31. In step ST31, the action plan unit 42 determines whether or not the stop position determined in steps ST16, ST18, ST20 and ST21 is within a predetermined range (hereinafter, a first region) from the current position of the vehicle. In the present embodiment, the first region is determined according to the distance from the current location of the vehicle. More specifically, the action plan unit 42 may determine that the stop position is within the first region when the stop position is within an area having a radius of, for example, 200 m from the current position of the vehicle. When the stop position is within the first region, the action plan unit ends the stop position determination process, and when not within the predetermined range, executes step ST32.

In step ST32, the action plan unit 42 determines a position closer to the vehicle than the boundary of the first region as the stop position, instead of the stop position determined in steps ST16, ST18, ST20 and ST21. More specifically, in step ST32, the action plan unit 42 extracts a position where the vehicle can be brought to a stop within a predetermined range (hereinafter, referred to as a second region) defined within the first region centered around the current location of the vehicle. Then, instead of the stop position determined in steps ST16, ST18, ST20 and ST21, the extracted position is newly determined as the stop position. In the present embodiment, the second region is set to be an area within a radius of 50 m from the current position of the vehicle, and the action plan unit 42 determines the stop position in front of the vehicle and in the second region. When the determination of the stop position is completed, the action plan unit 42 ends the stop position determination process.

The advantages of the vehicle control system 101 of the second embodiment configured as described above will be discussed in the following. When the stop position determined in steps ST16, ST18, ST20 and ST21 is outside the first region, the stop position is determined again in the second region closer to the vehicle within the first region. Therefore, since the vehicle can be stopped at a position closer to the current location, the vehicle can be brought to a stop more quickly.

The present invention has been described in terms of a specific embodiment, but is not limited by such an embodiment, but can be modified in various ways without departing from the scope of the present invention. In the foregoing embodiments, the stop position was determined according to the vehicle speed. However, it is also possible to determine a need for a rescue operation for the driver according to a signal from a heart rate sensor provided in the driver's seat, and when a rescue operation is found to be necessary, the stop position may be determined to be closer to the current position than otherwise by reducing the stop distance so that the driver may be rescued with a minimum time delay.

In step ST13 of the foregoing embodiments, the vehicle S was decelerated and moved leftward in the traveling lane, but the present invention is not limited to this mode. For example, in step ST13, only the deceleration of the vehicle S may be performed.

In the foregoing embodiments, left-hand traffic was assumed, but the present invention is not limited to this mode. When applying the present invention to a region or a country of right-hand traffic, the vehicle control system 1 may control the vehicle in such a manner that the left and right sides mentioned in the disclosure are interchanged.

Figure 7B:
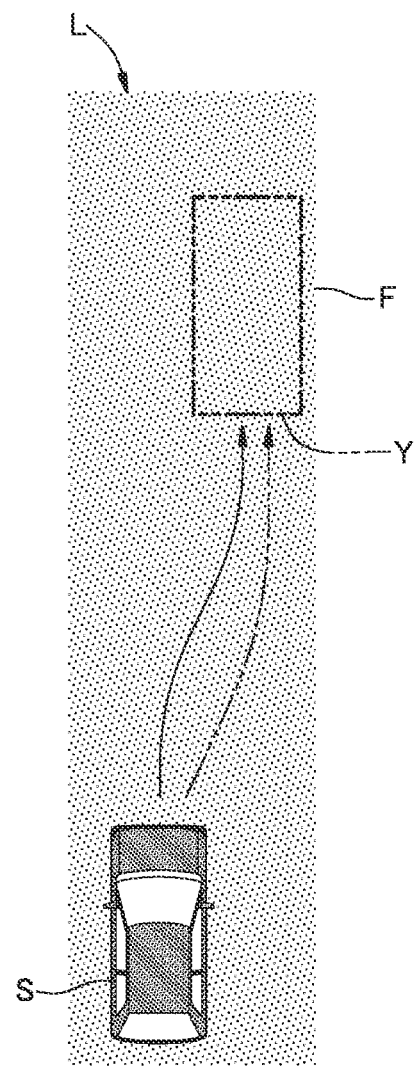
FIG. 7B is a view similar to FIG. 4B in the case of right-hand traffic, instead of left-hand traffic.
Figure 8A:
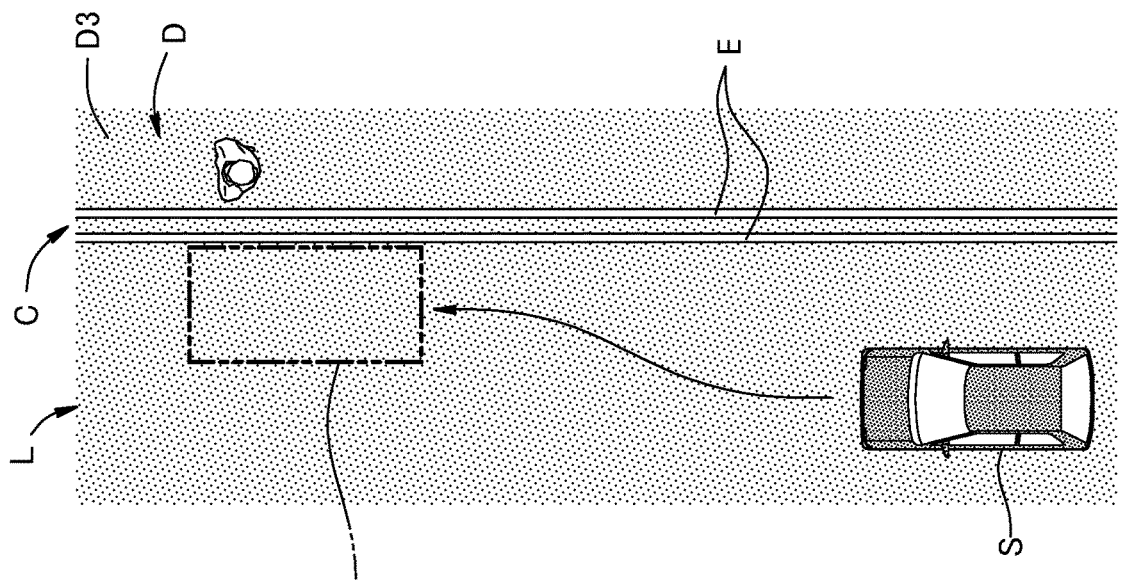
FIG. 8A is a view similar to FIG. 5A in the case of right-hand traffic, instead of left-hand traffic.
Figure 8B:
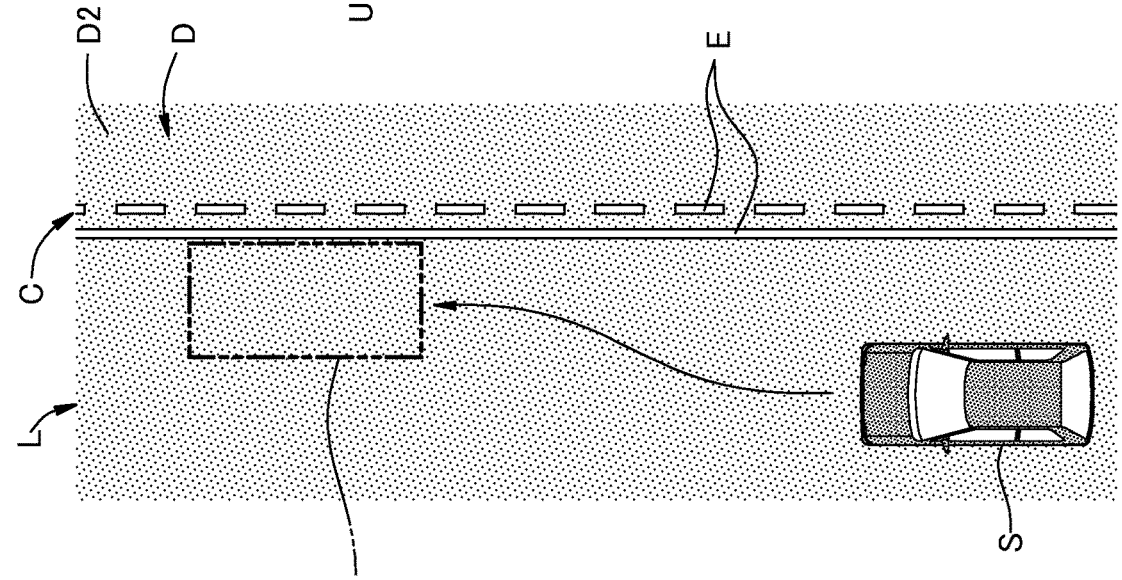
FIG. 8B is a view similar to FIG. 5B in the case of right-hand traffic, instead of left-hand traffic.
Figure 8C:
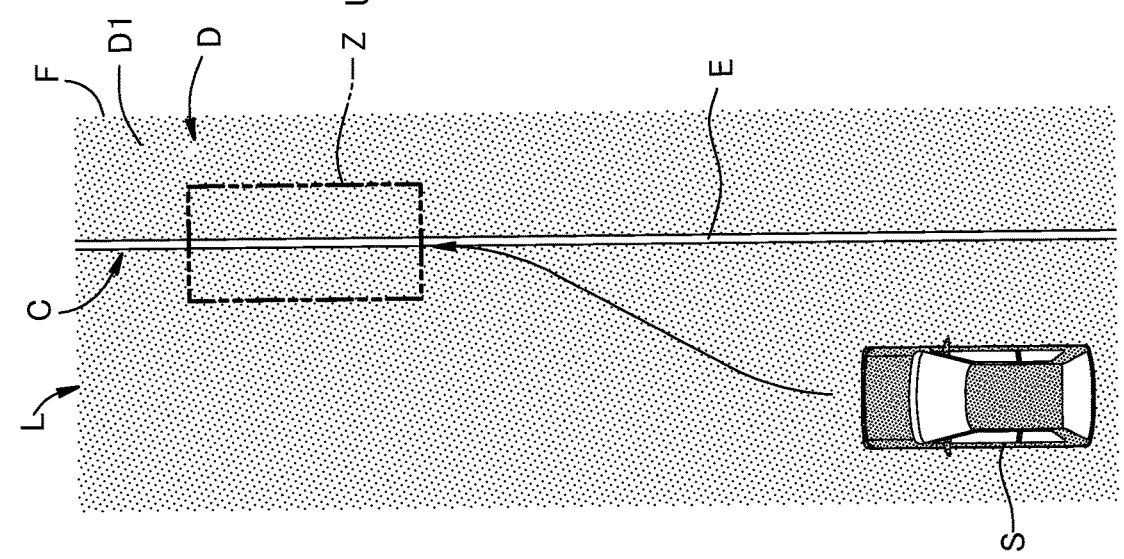
FIG. 8C is a view similar to FIG. 5C in the case of right-hand traffic, instead of left-hand traffic.

More specifically, as shown in FIG. 7A, when the control unit 15 recognizes a sidewalk in front of or to the right of the vehicle, the control unit 15 determines that the stop position will be a part of the road within the roadway and on the right edge of the roadway, and the vehicle should be brought to a stop in this position. As shown in FIG. 7B, when the control unit 15 recognizes that there is no sidewalk and no road shoulder in front of or on the right side of the vehicle, the control unit 15 brings the vehicle to a stop at a position along the right edge of the road. As shown in FIG. 8A, when the control unit 15 recognizes that there is no sidewalk in front of or to the right of the vehicle, and there is a road sign indicating a road shoulder that can be used for stopping or parking a vehicle, the control unit 15 moves the vehicle to the right side of the road, and brings the vehicle to a stop in a part of the road which is spaced from the right edge of the road by a prescribed distance. More specifically, when the vehicle is brought to a stop, there is a certain gap between the right side of the vehicle and the right edge of the road. As shown in FIGS. 8B and 8C, when the control unit 15 recognizes that there is a road shoulder D ahead or on the side of the vehicle, and there is a road sign indicating that stopping or parking a vehicle on the road shoulder is not permitted, the vehicle may be brought to a stop at a position outside of the road shoulder (in which a vehicle is not allowed to be stopped or parked) and on the left edge of the road shoulder (or on the right edge of the roadway and inside of the roadway).

In the foregoing embodiments, the external environment recognition unit 40 computed the similarity according to the image captured by the external camera 19, but the present invention is not limited to this mode. For example, the external environment recognition unit 40 may compute the similarity according to the information acquired by the external environment recognition device 6 which may be a sensor that detects an object outside of the vehicle such as a radar and a lidar.

The invention claimed is:

1. A vehicle system, comprising:
   a control unit for steering, accelerating, and decelerating a vehicle;
   an occupant monitoring device configured to monitor a driver of the vehicle;
   an external environment recognition device configured to acquire information on an environment surrounding the vehicle; and
   a navigation device configured to identify a current position of the vehicle and store map information,
   wherein the control unit is configured to execute a stop process by which the vehicle is parked in a prescribed stop position when it is detected that (i) the control unit or (ii) the driver, via the occupant monitoring device, has become incapable of maintaining a traveling state of the vehicle, and
   wherein, in executing the stop process, the external environment recognition device is configured to detect an object outside of the vehicle, and the control unit is configured to compute a degree of similarity between the detected object and a sidewalk or a road marking from the stored map information of the navigation device, and to determine whether the detected object is recognized as the sidewalk or the road marking according to the degree of similarity,
   wherein, in executing the stop process, if the degree of similarity is equal to or lower than a prescribed threshold, the control unit decelerates the vehicle as a case of a failure to recognize the detected object as the sidewalk or the road marking,
   wherein, in executing the stop process, if the degree of similarity is greater than the prescribed threshold, the control unit determines the prescribed stop position according to the detected object that is recognized as the sidewalk or the road marking.

2. The vehicle system according to claim 1, wherein when a sidewalk is recognized in front of or on a side of the vehicle according to the signal from the external environment recognition device while the stop process is being executed, the control unit determines the prescribed stop position in a part of a roadway bordering a right edge of the roadway.

3. The vehicle system according to claim 1, wherein when a sidewalk is not recognized, and a road marking permitting parking in a road shoulder is detected in front of or on a side of the vehicle according to the signal from the external environment recognition device while the stop process is being executed, the control unit determines the prescribed stop position on a part of a road so as to define a space of a prescribed width between a right side of the vehicle and a right edge of the road shoulder.

4. The vehicle system according to claim 1, wherein when a sidewalk is not recognized, and a road marking prohibiting parking in a road shoulder is detected in front of or on a side of the vehicle according to the signal from the external environment recognition device while the stop process is being executed, the control unit determines the prescribed stop position on a part of a road bordering a left edge of the road shoulder.

5. The vehicle system according to claim 1, wherein when a sidewalk is not recognized, and a shoulder is not recognized according to the signal from the external environment recognition device while the stop process is being executed, the control unit determines the prescribed stop position in a part of a road bordering a right edge of the road.

6. The vehicle system according to claim 1, wherein in executing the stop process, when the degree of similarity is equal to or lower than the prescribed threshold, the control unit decelerates the vehicle as a case of the failure to recognize the sidewalk or the road marking, and moves the vehicle rightward by a prescribed distance.

7. The vehicle system according to claim 1, wherein in executing the stop process, the control unit brings the vehicle to a stop at the prescribed stop position when the prescribed stop position is within a prescribed range from the current position of the vehicle, and at a position closer to the vehicle than a boundary of the prescribed range when the prescribed stop position is outside of the prescribed range.

\* \* \* \* \*

UNITED STATES PATENT AND TRADEMARK OFFICE
CERTIFICATE OF CORRECTION

| | |
|---|---|
| PATENT NO. | : 11,760,380 B2 |
| APPLICATION NO. | : 16/832757 |
| DATED | : September 19, 2023 |
| INVENTOR(S) | : Kanta Tsuji et al. |

It is certified that error appears in the above-identified patent and that said Letters Patent is hereby corrected as shown below:

On the Title Page

In item (54), in Title, delete "VEHICLE CONTROL SYSTEM" and insert therefor -- VEHICLE SYSTEM --.

In the Specification

Column 1, Line 1, delete "VEHICLE CONTROL SYSTEM" and insert therefor -- VEHICLE SYSTEM --.

Signed and Sealed this
Twenty-sixth Day of December, 2023

Katherine Kelly Vidal
*Director of the United States Patent and Trademark Office*